(12) United States Patent
Nakauchi et al.

(10) Patent No.: US 10,191,640 B2
(45) Date of Patent: Jan. 29, 2019

(54) CONTROL PARAMETER SETTING METHOD FOR USE IN ILLUMINATION SYSTEM, AND OPERATION TERMINAL

(71) Applicant: Panasonic Intellectual Property Management Co., Ltd., Osaka (JP)

(72) Inventors: Natsuka Nakauchi, Osaka (JP); Kentaro Yamauchi, Hyogo (JP); Tomokazu Yamamoto, Osaka (JP); Yoshiaki Ueno, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/961,581

(22) Filed: Apr. 24, 2018

(65) Prior Publication Data

US 2018/0314412 A1   Nov. 1, 2018

(30) Foreign Application Priority Data

Apr. 28, 2017  (JP) ................................ 2017-089230

(51) Int. Cl.
*H04N 5/232* (2006.01)
*H05B 33/08* (2006.01)
(Continued)

(52) U.S. Cl.
CPC ........ *G06F 3/04847* (2013.01); *G06F 3/0488* (2013.01); *G06F 3/04842* (2013.01); *H05B 33/0863* (2013.01); *H04N 5/23293* (2013.01)

(58) Field of Classification Search
CPC ............ G06F 3/04847; G06F 3/04842; G06F 3/0488; H05B 33/0863; H05B 37/0272; H05B 37/038; H05B 37/034
See application file for complete search history.

(56) References Cited

U.S. PATENT DOCUMENTS

2013/0201098 A1* 8/2013 Schilit .................. H04L 12/282
   345/156
2014/0062334 A1* 3/2014 Nagazoe ............ H05B 33/0863
   315/292
(Continued)

FOREIGN PATENT DOCUMENTS

JP   2012-69423 A   4/2012
JP   2014-044915 A  3/2014
(Continued)

*Primary Examiner* — Dedei K Hammond
*Assistant Examiner* — Raymond R Chai
(74) *Attorney, Agent, or Firm* — McDermott Will & Emery LLP

(57) ABSTRACT

Provided is a control parameter setting method for use in an illumination system including: luminaires; an illumination controller that controls lighting of the luminaires; and an operation terminal that communicates with the illumination controller. The control parameter setting method includes: capturing, by a camera of the operation terminal, at least one luminaire in an image, and displaying, by a touch panel of the operation terminal, the image including the at least one luminaire; obtaining identification information of the at least one luminaire based on the image; determining whether a control parameter of the at least one luminaire captured by the camera is settable by the operation terminal; displaying, by the touch panel, information relating to the identification information, in association with the at least one luminaire; displaying, by the touch panel, a control parameter of a luminaire; and setting, by the touch panel, the control parameter of the luminaire.

13 Claims, 12 Drawing Sheets

(51) Int. Cl.
    *G06F 3/0484*     (2013.01)
    *G06F 3/0488*     (2013.01)

(56) References Cited

U.S. PATENT DOCUMENTS

| | | | |
|---|---|---|---|
| 2014/0070707 A1* | 3/2014 | Nagazoe | H04B 10/116 315/151 |
| 2015/0145435 A1* | 5/2015 | Ogawa | H05B 37/0272 315/294 |
| 2015/0189723 A1* | 7/2015 | Ogawa | H05B 37/0272 315/294 |
| 2015/0201480 A1 | 7/2015 | Ogawa | |
| 2016/0037614 A1* | 2/2016 | Setomoto | H05B 37/02 315/294 |
| 2016/0302288 A1 | 10/2016 | Gotoh et al. | |
| 2016/0302289 A1* | 10/2016 | Nishioka | H04W 76/10 |
| 2017/0063455 A1* | 3/2017 | Muguruma | H04B 10/116 |

FOREIGN PATENT DOCUMENTS

| | | |
|---|---|---|
| JP | 2014-044916 A | 3/2014 |
| JP | 2015-128043 A | 7/2015 |
| JP | 2015-144116 A | 8/2015 |
| JP | 2015-149710 A | 8/2015 |
| JP | 2016-031864 A | 3/2016 |
| JP | 2016-201269 A | 12/2016 |
| JP | 2016-201270 A | 12/2016 |

\* cited by examiner

CONTROL PARAMETER SETTING METHOD FOR USE IN ILLUMINATION SYSTEM, AND OPERATION TERMINAL

CROSS REFERENCE TO RELATED APPLICATION

This application claims the benefit of priority of Japanese Patent Application Number 2017-089230 filed on Apr. 28, 2017, the entire content of which is hereby incorporated by reference.

BACKGROUND

1. Technical Field

The present disclosure relates to a control parameter setting method for use in an illumination system including luminaires, an illumination controller, and an operation terminal, and an operation terminal that sets a control parameter of the illumination system.

2. Description of the Related Art

Conventionally, an illumination system is known which includes luminaires, an illumination controller, and an operation terminal. Patent Literature (PTL) 1 (Japanese Unexamined Patent Application Publication No. 2012-69423) discloses, as an example of the illumination system of such a kind, capturing luminaires in an image using a camera of an operation terminal, identifying a luminaire to be dimmed from among the luminaires, by checking the captured image against layout information about the luminaires stored in the operation terminal in advance, and setting the dimming level of the luminaire.

SUMMARY

However, if an operation terminal does not store layout information about luminaires, the method disclosed in PTL 1 does not make it possible to identify a luminaire to be dimmed from among the luminaires and to set a control parameter, such as dimming, of the luminaire. Moreover, incorrect setting is caused by a wrong selection because an operation to select a luminaire, of which a control parameter is to be set, while seeing a lighting layout displayed on the operation terminal is not intuitive.

In view of the above, the present disclosure provides, for example, a control parameter setting method for use in an illumination system, which makes it easy to set a control parameter of a luminaire.

A control parameter setting method for use in an illumination system according to one aspect of the present disclosure is a control parameter setting method for use in an illumination system including: luminaires; an illumination controller that controls lighting of the luminaires; and an operation terminal that communicates with the illumination controller. The control parameter setting method includes: capturing, by a camera of the operation terminal, at least one luminaire among the luminaires in an image, and displaying, by a touch panel of the operation terminal, the image including the at least one luminaire captured by the camera; obtaining identification information of the at least one luminaire based on the image; determining whether a control parameter of the at least one luminaire captured by the camera is settable by the operation terminal; displaying, by the touch panel, information relating to the identification information, in association with the at least one luminaire, when the control parameter is determined to be settable by the operation terminal; when a user selects a luminaire from among the at least one luminaire in the image displayed on the touch panel, displaying, by the touch panel, a control parameter of the luminaire selected; and setting, by the touch panel, the control parameter of the luminaire selected.

Moreover, an operation terminal according to one aspect of the present disclosure is an operation terminal that includes: a touch panel that displays and sets a control parameter of each of luminaires; a camera that captures at least one luminaire among the luminaires in an image; and a controller that causes the touch panel to display the image including the at least one luminaire captured by the camera. The controller obtains identification information of the at least one luminaire based on the image; causes, when the control parameter of the at least one luminaire captured by the camera is settable based on an instruction, the touch panel to display information relating to the identification information, in association with the at least one luminaire; and further causes, when a luminaire is selected from among the at least one luminaire in the image, the touch panel to display the control parameter of the luminaire selected and to allow setting of the control parameter of the luminaire selected.

It is possible to easily set a control parameter of a luminaire.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter, embodiments will be described with reference to the drawings. It should be noted that the embodiments described below each show a specific example. As such, the numerical values, shapes, materials, structural components, the arrangement and connection of the structural components, etc. shown in the following embodiments are mere examples, and are not intended to limit the scope of the present disclosure. Therefore, among the structural components in the following embodiments, structural components not recited in any one of the independent claims which indicate the broadest concepts of the present disclosure are described as optional structural components.

It should be noted that the figures are schematic diagrams and are not necessarily precise illustrations. Furthermore, in the figures, substantially identical components are assigned the same reference signs, and overlapping description may be omitted or simplified.

Embodiment 1

[1-1. Schematic Configuration of Illumination System]

Figure 1:
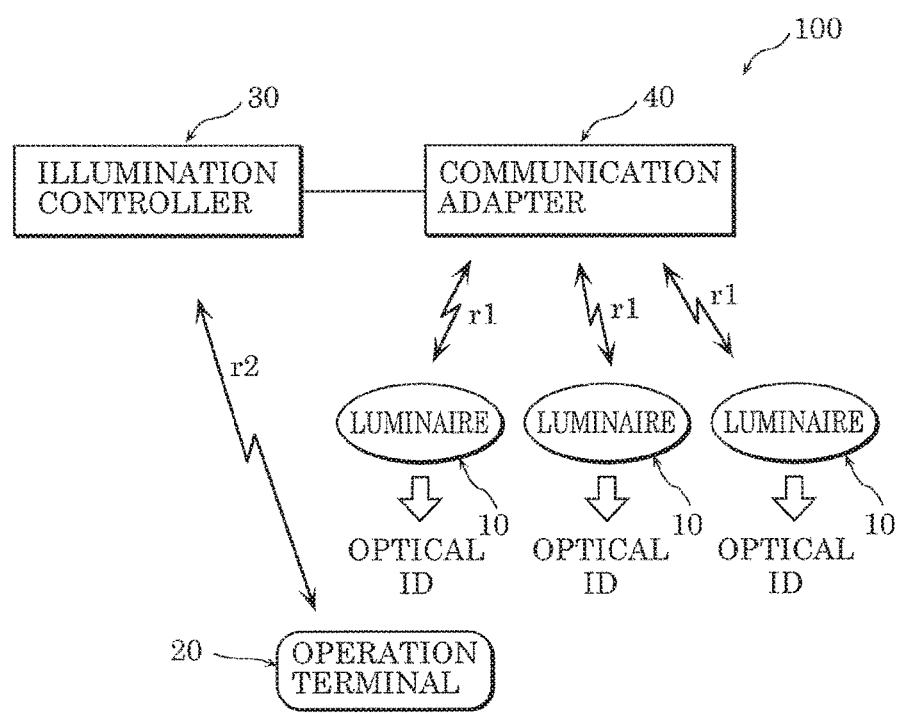
FIG. 1 is a schematic diagram illustrating an illumination system according to Embodiment 1 that includes luminaires, an illumination controller, a communication adapter, and an operation terminal.
Figure 2:
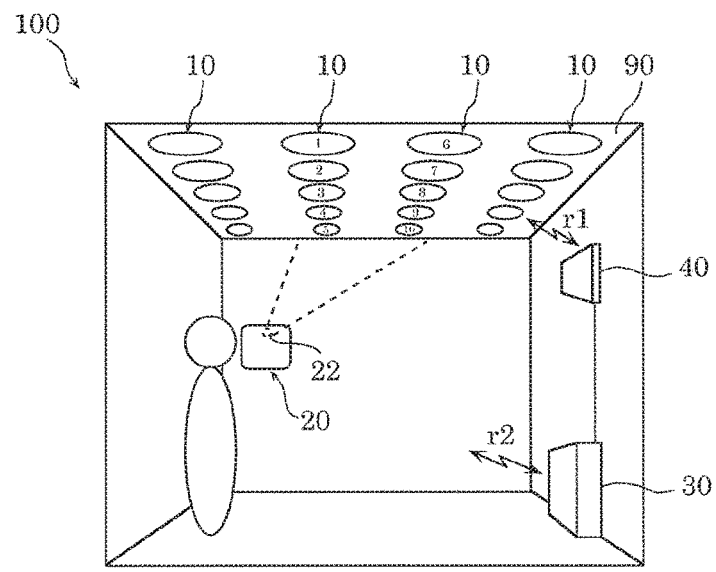
FIG. 2 is a diagram illustrating an exemplary layout of the luminaires, illumination controller, communication adapter, and operation terminal according to Embodiment 1.
Figure 3:
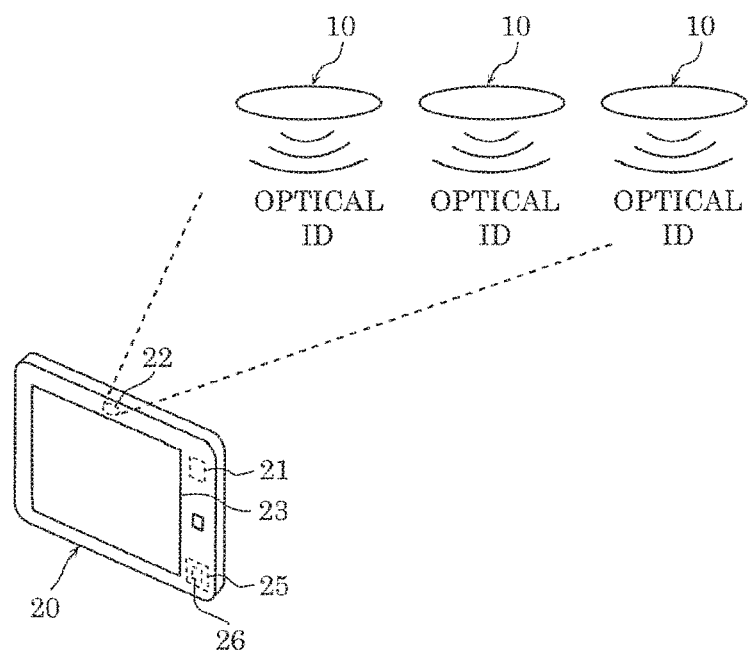
FIG. 3 is a diagram illustrating how luminaires are captured in an image using the operation terminal according to Embodiment 1.

FIG. 1 is a schematic diagram illustrating illumination system 100 according to Embodiment 1 that includes luminaires 10, illumination controller 30, communication adapter 40, and operation terminal 20. FIG. 2 is a diagram illustrating an exemplary layout of luminaires 10, illumination controller 30, communication adapter 40, and operation terminal 20. FIG. 3 is a diagram illustrating how luminaires 10 are captured in an image using operation terminal 20.

Illumination system 100 includes luminaires 10, illumination controller 30, communication adapter 40 connected to illumination controller 30, and operation terminal 20. Although FIG. 1 shows three luminaires 10, this figure is an example. In practice, at least 100 luminaires may be installed in, for example, ceiling 90 of a building (see FIG. 2).

First, the following describes a communication system among luminaires 10, illumination controller 30, communication adapter 40, and operation terminal 20 included in illumination system 100 with reference to FIG. 1 to FIG. 3.

Each of luminaires 10 and illumination controller 30 are communicable via radio waves r1 through communication adapter 40. Examples of the communication system via radio waves r1 include specified low power radio that uses a frequency in the 920 MHz or 2.4 GHz band, Zigbee (registered trademark), Bluetooth (registered trademark), and WiFi (registered trademark). It should be noted that luminaires 10 and communication adapter 40 may form a wired network to be communicable with each other.

Illumination controller 30 and operation terminal 20 are communicable via radio waves r2. A communication system via radio waves r2 is the same as the communication system via radio waves r1. It should be noted that operation terminal 20 and illumination controller 30 may be communicable over a wired connection via a connection terminal such as a USB.

Each of luminaires 10 is capable of not only emitting illumination light but also performing visible light communication, using an optical identifier (ID).

In Embodiment 1, when illumination system 100 is allowed to set control parameters of luminaires 10, each luminaire 10 transmits an optical ID (see FIG. 3). The optical ID includes identification information, a control parameter, etc. of luminaire 10. Identification information of luminaire 10 is, for example, information assigned to luminaire 10 to distinguish luminaire 10 from other luminaires 10. Control parameters each are, for example, a parameter for determining diming, toning, a group, etc. of luminaire 10. Illumination system 100 is configured to receive the optical ID from each luminaire 10 using camera 22 of operation terminal 20, obtain the identification information and control parameter of luminaire 10, and set the control parameter of luminaire 10.

[1-2. Components of Illumination System]

Figure 4:
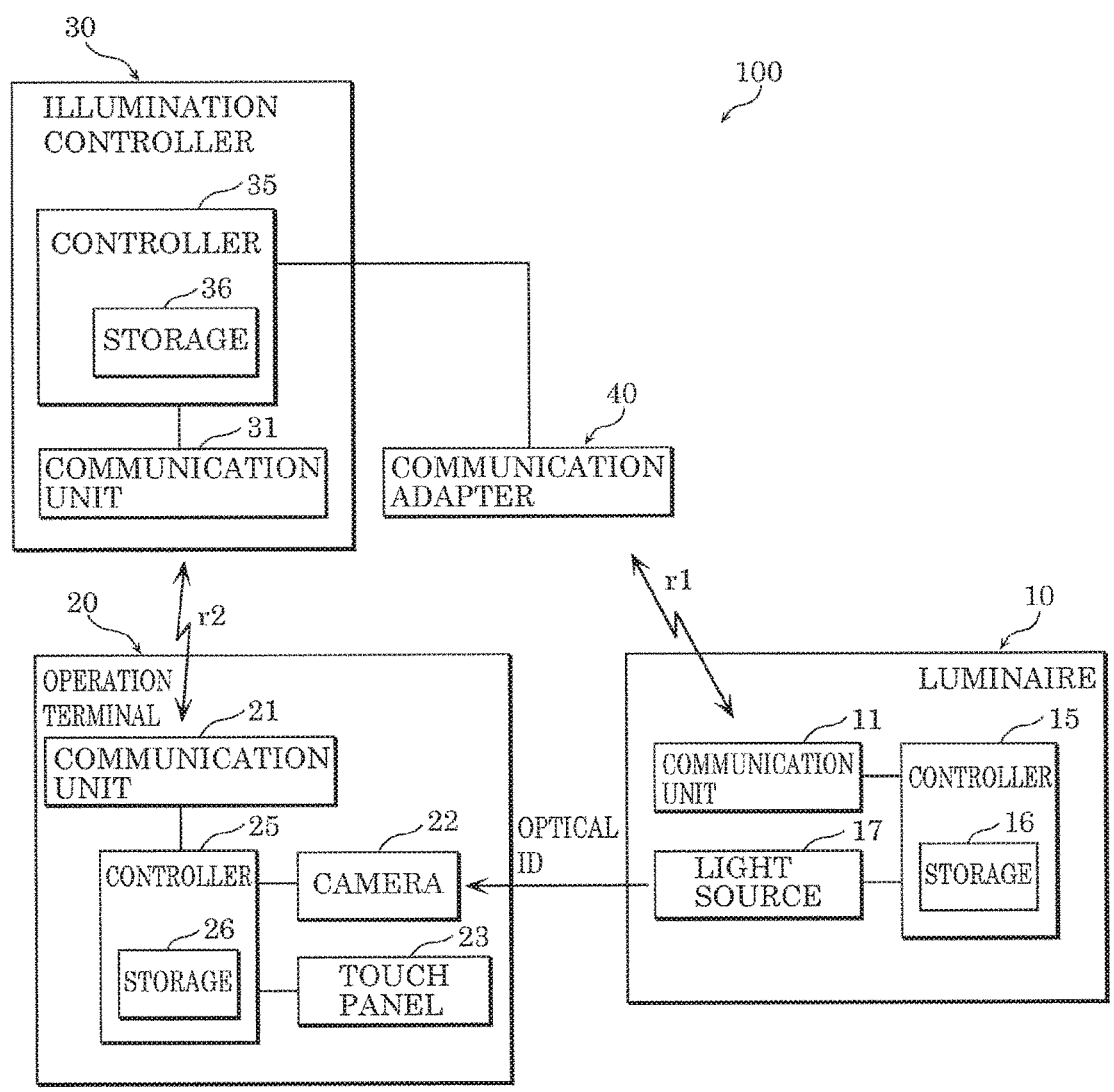
FIG. 4 is a block diagram illustrating a control configuration of the illumination system according to Embodiment 1.

Next, the following describes luminaires 10, operation terminal 20, illumination controller 30, and communication adapter 40 included in illumination system 100. FIG. 4 is a block diagram illustrating a control configuration of illumination system 100.

Luminaires 10 each include: controller 15 including storage 16; light source 17 connected to controller 15; and communication unit 11.

Light source 17 includes light-emitting diodes that emit white light, red light, green light, or blue light. When illumination system 100 is allowed to set the control parameter of luminaire 10, light source 17 transmits an optical ID together with illumination light. While transmitting the optical ID, light source 17 performs quick blinking that cannot be recognized visually.

Controller 15 includes a central processing unit (CPU), and a random-access memory (RAM), a read-only memory (ROM), etc., that is, storage 16.

Storage 16 stores identification information (ID) such as a media access control (MAC) address or unique device identifier (UDID) of luminaire 10. Moreover, storage 16 stores identification information of illumination controller 30. The identification information of illumination controller 30 is written in storage 16 in advance by pairing luminaire 10 and illumination controller 30.

Controller 15 controls at least one of dimming and toning of light source 17. Moreover, controller 15 causes light source 17 to transmit the optical ID, by modulating light from light source 17. The optical ID includes identification information and a control parameter of luminaire 10, and identification information of illumination controller 30.

Communication unit 11 is an antenna, a wireless module, etc., and communicates with illumination controller 30 through communication adapter 40. When receiving a control parameter setting instruction from illumination controller 30 through communication unit 11, luminaire 10 is configured to change, for example, luminance or a light color based on the set control parameter.

Illumination controller 30 is a management server that controls lighting of each luminaire 10. As illustrated in FIG. 4, illumination controller 30 includes controller 35 including storage 36, and communication unit 31 connected to controller 35. Controller 35 is connected to communication adapter 40. It should be noted that communication adapter 40 is an antenna, a wireless module, etc., and is disposed outside of illumination controller 30.

Controller 35 includes a CPU, and a RAM, a ROM, etc., that is, storage 36. A control parameter of luminaire 10 set in illumination system 100 is written in storage 36. Communication unit 31 communicates with operation terminal 20 via radio waves r2. When communicating with operation terminal 20, controller 35 is configured to transmit the identification information of illumination controller 30 to operation terminal 20.

Operation terminal 20 is, for example, a tablet terminal or smartphone, and is a setter that sets the control parameters of luminaires 10 in Embodiment 1. Operation terminal 20 includes controller 25 including storage 26, communication unit 21 connected to controller 25, camera 22, and touch panel 23.

Communication unit 21 is an antenna, a wireless module, etc. When communicating with illumination controller 30, operation terminal 20 receives the identification information of illumination controller 30. In addition, operation terminal 20 transmits a set control parameter of luminaire 10 to illumination controller 30.

Camera 22 includes an imaging element. Camera 22 is disposed on a surface opposite to a surface of operation terminal 20 on which touch panel 23 is disposed, and can be turned to, for example, ceiling 90 to capture luminaires 10 on ceiling 90 etc. in an image. In addition, camera 22 receives the optical ID from each luminaire 10. In the case of receiving the optical ID, an image captured by camera 22 is a moving image.

Controller 25 includes a CPU, and a RAM, a ROM, etc., that is, storage 26. Controller 25 obtains the identification information of each luminaire 10 and the identification information of illumination controller 30 that controls luminaires 10, based on information included in the optical IDs received by camera 22.

In addition, controller 25 determines whether the control parameters of captured luminaires 10 are settable by controller 25. Specifically, controller 25 determines whether the identification information of illumination controller 30 included in the optical IDs is identical to identification information of illumination controller 30 obtained through communication unit 21. When the former identification information is determined to be identical to the latter identification information, controller 25 determines that the control parameters of captured luminaires 10 are settable by controller 25.

Figure 5:
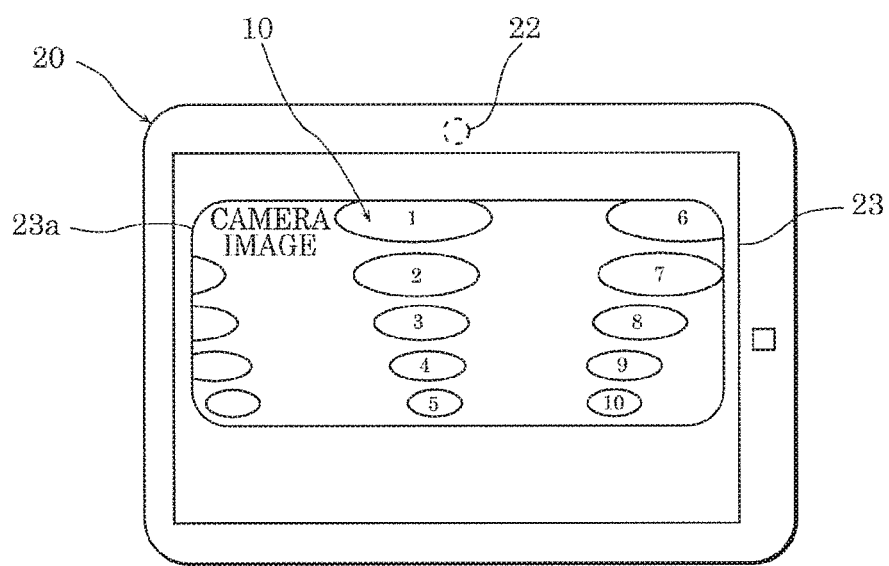
FIG. 5 is a diagram illustrating an exemplary image displayed on the operation terminal in Embodiment 1.
Figure 6:
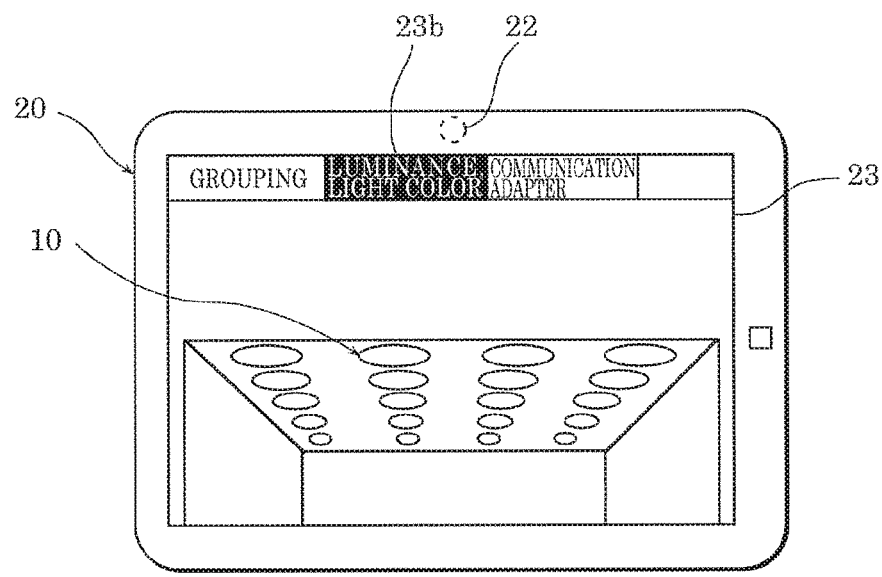
FIG. 6 is a diagram illustrating another exemplary image displayed on the operation terminal in Embodiment 1.
Figure 7:
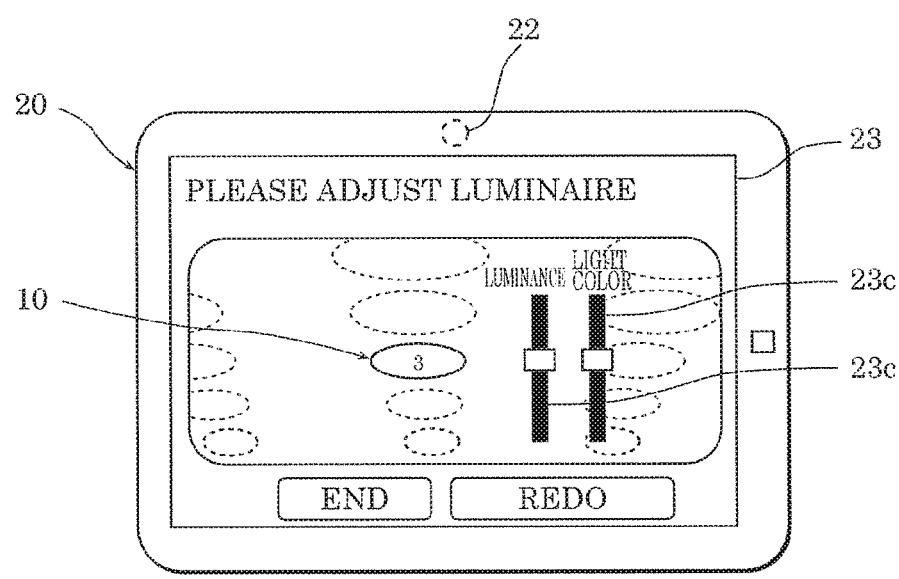
FIG. 7 is a diagram illustrating still another exemplary image displayed on the operation terminal in Embodiment 1.

Touch panel 23 displays an image including luminaires 10 captured by camera 22. FIG. 5 is a diagram illustrating an exemplary image displayed on operation terminal 20. FIG. 6 and FIG. 7 each are a diagram illustrating another exemplary image displayed on operation terminal 20.

As illustrated in FIG. 5 to FIG. 7, touch panel 23 includes camera image display portion 23a, parameter selection portion 23b, and parameter displaying and setting portion 23c.

Camera image display portion 23a is a portion for displaying an image including luminaires 10 captured by camera 22. Information relating to the identification information of each luminaire 10 is displayed in camera image display portion 23a, in association with luminaires 10. For example, FIG. 5 shows the numbers "1 to 10" that are the information relating to the identification information, in association with luminaires 10. A user can select luminaire 10 of which the control parameter is to be adjusted from the image displayed in camera image display portion 23a.

Parameter selection portion 23b is a portion for displaying a control parameter to be selected. In FIG. 6, "GROUPING," "LUMINANCE, LIGHT COLOR," and "COMMUNICATION ADAPTER" are displayed as selection candidates for control parameter in parameter selection portion 23b. For example, when "LUMINANCE, LIGHT COLOR" is touched, "LUMINANCE, LIGHT COLOR" is selected as control parameters to be adjusted.

Parameter displaying and setting portion 23c is a portion for displaying and setting a control parameter. FIG. 7 shows luminaire 10 having the number "3" as luminaire 10 of which the control parameters are to be adjusted, and adjustment bars for adjusting luminance and a light color. The control parameters for the luminance and light color can be set by changing the control parameters using the adjustment bars.

[1-3. Control Parameter Setting Method for Use in Illumination System]

Next, the following describes in detail a control parameter setting method for use in illumination system 100.

Figure 8:
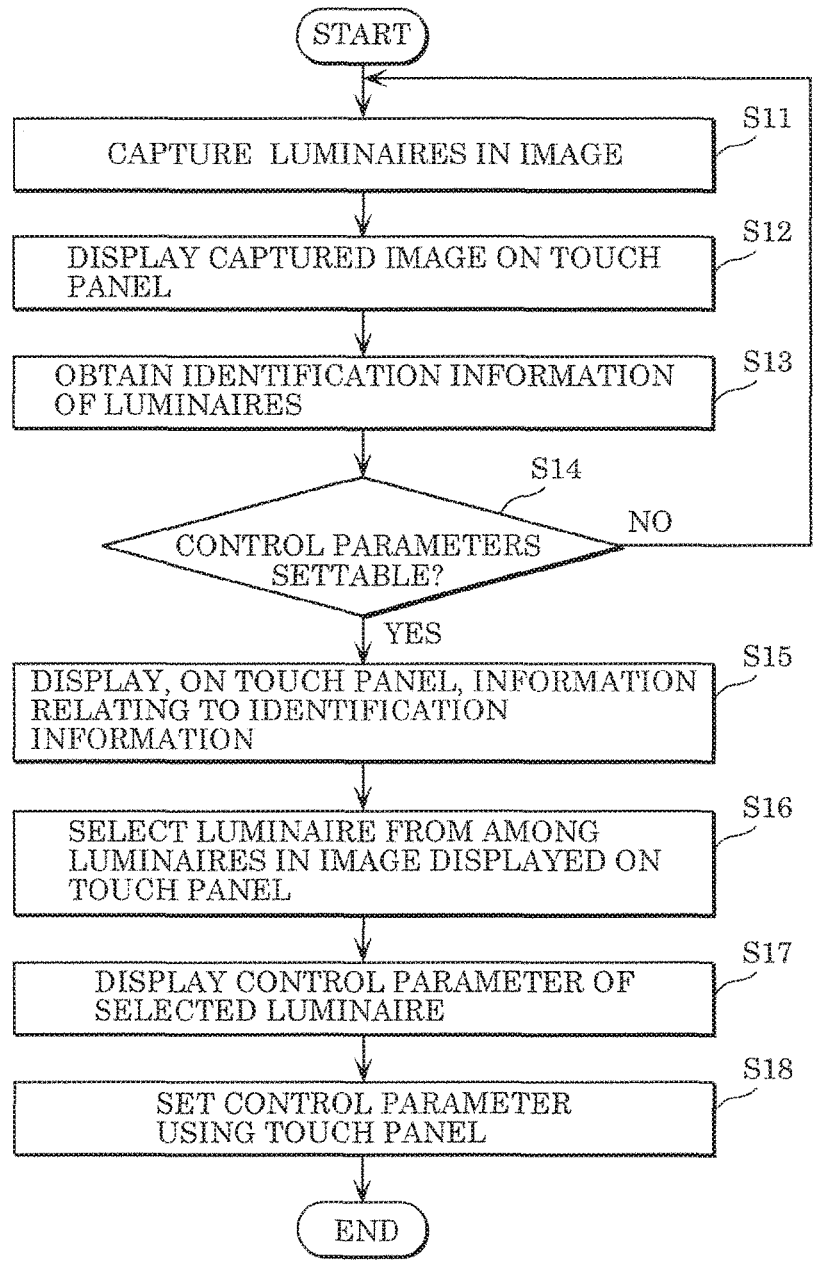
FIG. 8 is a flow chart for a control parameter setting method for use in an illumination system according to Embodiment 1.
Figure 9:
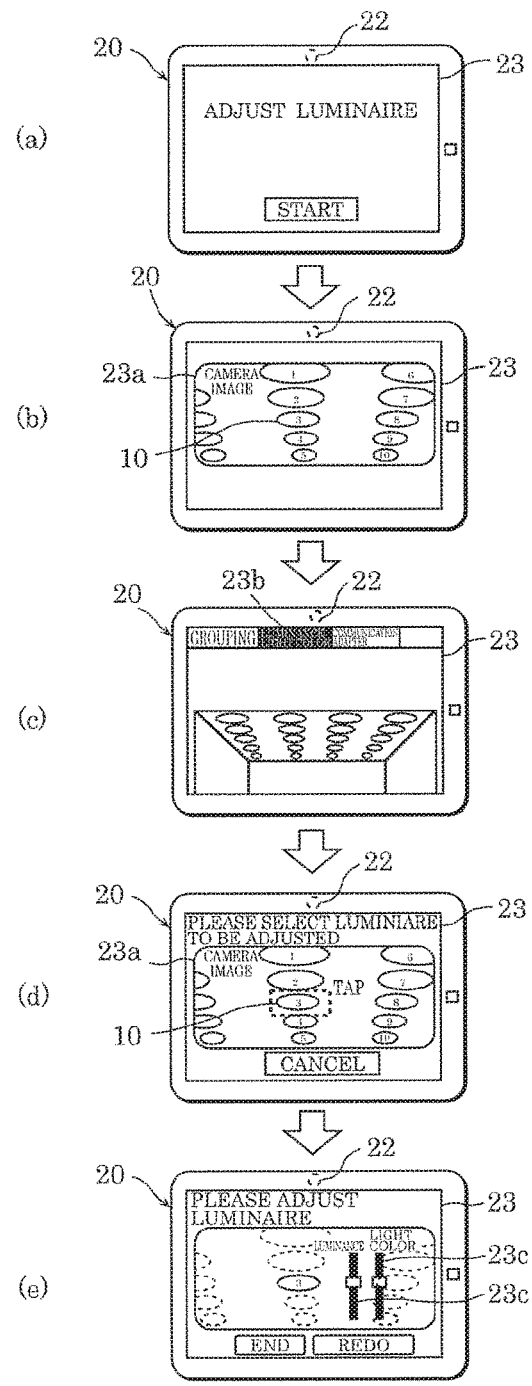
FIG. 9 is a diagram illustrating images sequentially displayed on the operation terminal in Embodiment 1.

FIG. 8 is a flow chart illustrating the control parameter setting method for use in illumination system 100. FIG. 9 is a diagram illustrating images sequentially displayed on operation terminal 20.

First, as illustrated in (a) in FIG. 9, the message "ADJUST LUMINAIRE" is displayed on touch panel 23 of operation terminal 20. When the key "START" of touch panel 23 is touched, control parameters of luminaires 10 get ready to be set. Each luminaire 10 is caused to transmit an optical ID when the key "START" is pressed.

Next, camera 22 of operation terminal 20 captures luminaires 10 in an image (S11), and touch panel 23 displays the image including luminaires 10 captured by camera 22 (S12). Specifically, camera 22 of operation terminal 20 captures, in an image, luminaires 10 in a direction toward ceiling 90. The captured image is almost directly displayed on touch panel 23. As a result, the user can see luminaires 10 through camera 22. It should be noted that at least one luminaire 10 may be targeted for capturing. In Embodiment 1, a captured image is a moving image, and camera 22 receives the optical ID from each luminaire 10. Luminaires 10 targeted for capturing can be changed by turning camera 22 to a different direction or varying the focal length of the lens.

Next, the identification information of each luminaire 10 is obtained based on the captured image (S13). As stated, each luminaire 10 transmits the optical ID. The transmitted optical ID includes the identification information of luminaire 10 and the identification information of illumination controller 30. Controller 25 of operation terminal 20 extracts the identification information of luminaire 10 and the identification information of illumination controller 30 from the received optical ID.

Next, operation terminal 20 determines whether the control parameters of captured luminaires 10 are settable by operation terminal 20 (S14). Specifically, when the identification information of illumination controller 30 obtained in step S13 matches identification information of illumination controller 30 actually communicating with operation terminal 20, operation terminal 20 determines that the control parameters are settable (Yes in S14). When the former identification information is different from the latter identification information, operation terminal 20 determines that the control parameters are not settable (No in S14), and the process returns to step S11.

When the control parameters of luminaires 10 are settable by operation terminal 20, touch panel 23 displays information relating to the identification information, in association with luminaires 10 (S15). Specifically, as illustrated in (b) in FIG. 9, the numbers "1 to 10" are displayed in association with luminaires 10 on a one-to-one basis. It should be noted that the information relating to the identification information is not limited to numerals, and may be alphabets, symbols, or the identification information itself (MAC address, UDID, etc.).

Touch panel 23 displays control parameters to be selected in parameter selection portion 23b. For example, as illustrated in (c) in FIG. 9, selection candidates for control parameter such as "GROUPING," "LUMINANCE, LIGHT COLOR," and "COMMUNICATION ADAPTER" are displayed. In (c) in FIG. 9, "LUMINANCE, LIGHT COLOR" are selected as the control parameters.

Next, luminaire 10 is selected from among luminaires 10 in the image displayed on touch panel 23 (S16). Specifically, as illustrated in (d) in FIG. 9, the user touches and selects luminaire 10 of which the control parameters are to be adjusted, in the image displayed on touch panel 23. The user may select one luminaire 10 or at least two luminaires 10. In (d) in FIG. 9, luminaire 10 corresponding to the number "3" is selected.

When luminaire 10 of which the control parameters are to be adjusted is selected, touch panel 23 displays the control parameters of selected luminaire 10 (S17). For example, as illustrated in (e) in FIG. 9, adjustment bars for adjusting "LUMINANCE" and "LIGHT COLOR" of selected luminaire 10 having the number "3" are displayed in parameter displaying and setting portion 23c. These adjustment bars are displayed on touch panel 23 concurrently with selected luminaire 10.

Next, touch panel 23 sets the control parameters of selected luminaire 10 (S18). For example, as illustrated in (e) in FIG. 9, the control parameter for the luminance or light color can be adjusted by moving the adjustment bar for "LUMINANCE" or "LIGHT COLOR." At this time, the user can make the adjustment while checking how the luminance or light color of luminaire 10 changes on touch panel 23.

Next, when the "END" key displayed on touch panel 23 is pressed, the adjusted control parameter is set to operation terminal 20. The set control parameter is transmitted from operation terminal 20 to illumination controller 30, and is stored in storage 36 of illumination controller 30. Lighting of luminaire 10 is controlled based on the set control parameter. In addition, after the "END" key is pressed, luminaires 10 stop transmitting the optical IDs.

As described above, the user can select luminaire 10 of which the control parameter is to be adjusted while seeing displayed luminaires 10 through camera 22, and can set the control parameter of selected luminaire 10. For this reason, even if operation terminal 20 does not store layout information of luminaires 10 in advance, the user can easily set the control parameter of luminaire 10. Moreover, since captured luminaires 10 and the control parameter of luminaire 10 are simultaneously displayed alongside on touch panel 23, the user can perform the setting while visually checking luminaire 10 and the control parameter. Accordingly, it is possible to reduce the occurrence of errors in setting a control parameter and shorten the time taken to perform the setting. In addition, it is not necessary to compare the identification information of each luminaire 10, such as a lighting layout displayed on operation terminal 20, and luminaires 10 installed in an actual space, and it is possible to simply and quickly select luminaire 10 to be controlled, by directly selecting luminaire 10 from among luminaires 10 in the image captured by camera 22.

[1-4. Advantageous Effects, Etc.] A control parameter setting method for use in illumination system 100 according to Embodiment 1 is a control parameter setting method for use in illumination system 100 including: luminaires 10; illumination controller 30 that controls lighting of luminaires 10; and operation terminal 20 that communicates with illumination controller 30. The control parameter setting method includes: capturing, by camera 22 of operation terminal 20, at least one luminaire 10 among luminaires 10 in an image, and displaying, by touch panel 23 of operation terminal 20, the image including at least one luminaire 10 captured by camera 22; obtaining identification information of at least one luminaire 10 based on the image; determining whether a control parameter of at least one luminaire 10 captured by camera 22 is settable by operation terminal 20; displaying, by touch panel 23, information relating to the identification information, in association with at least one luminaire 10, when the control parameter is determined to be settable by operation terminal 20; when a user selects luminaire 10 from among at least one luminaire 10 in the image displayed on touch panel 23, displaying, by touch panel 23, a control parameter of luminaire 10 selected; and setting, by touch panel 23 from the user, the control parameter of luminaire 10 selected.

As described above, even if, for example, operation terminal 20 does not store in advance layout information of luminaires 10, by displaying, by touch panel 23, the image including captured luminaires 10 and setting, by touch panel 23, the control parameter of at least one luminaire 10, it is possible to easily set the control parameter of at least one luminaire 10. In addition, by determining whether the control parameters of luminaires 10 captured by camera 22 are settable by operation terminal 20, it is possible to easily determine which of luminaires 10 is luminaire 10 of which the control parameter is adjustable, and to improve the workability of setting the control parameters.

Moreover, the image may be a moving image.

With this, it is possible to set the control parameter of at least one luminaire 10 while seeing an operating state of at least one luminaire 10 disposed in close proximity.

Moreover, when at least one luminaire 10 is captured by camera 22, an optical ID is received from at least one luminaire 10, and in the obtaining of the identification information of at least one luminaire 10 based on the image, the identification information may be obtained based on information included in the optical ID received.

By using the optical ID, it is possible to quickly and accurately obtain the identification information of at least one luminaire 10.

Moreover, the control parameter setting method may further include obtaining identification information of illumination controller 30 based on the information included in the optical ID received, the obtaining of the identification information of illumination controller 30 based on the information included in the optical ID received being between the capturing and displaying (S12) and the determining (S14). In the determining (S14), when the identification information of illumination controller 30 obtained matches identification information of illumination controller 30 that communicates with operation terminal 20, the control parameter may be determined to be settable by operation terminal 20.

By determining whether illumination controller 30 connected to luminaires 10 matches illumination controller 30 connected to operation terminal 20, it is possible to easily determine which of luminaires 10 is luminaire 10 of which the control parameter is adjustable.

Moreover, when at least one luminaire 10 is captured by camera 22, optical communication may be performed between at least one luminaire 10 and operation terminal 20, and in the obtaining of the identification information of at least one luminaire 10 based on the image (S13), the identification information may be obtained based on information obtained through the optical communication.

Furthermore, the control parameter setting method may further include obtaining identification information of illumination controller 30 based on information obtained through optical communication, the obtaining of the identification information of the illumination controller based on the information obtained through the optical communication being between the capturing and displaying (S12) and the determining (S14). In the determining (S14), when the identification information of illumination controller 30 obtained matches identification information of illumination controller 30 that communicates with operation terminal 20, the control parameter may be determined to be settable by operation terminal 20.

Moreover, in the displaying of the control parameter of luminaire 10 selected (S17), luminaire 10 selected and the control parameter thereof may be simultaneously displayed.

With this, the user can perform the setting while visually checking captured luminaire 10 and the control parameter thereof. Accordingly, it is possible to reduce the occurrence of errors in setting a control parameter and shorten the time taken to perform the setting.

Moreover, the control parameter may be a parameter for determining either one of dimming, toning, and grouping of at least one luminaire 10.

According to Embodiment 1, it is possible to easily set one of dimming, toning, and grouping of at least one luminaire 10, which is an example of the control parameter.

Operation terminal 20 according to Embodiment 1 includes: touch panel 23 that displays and sets a control parameter of each of luminaires 10; camera 22 that captures at least one luminaire 10 among luminaires 10 in an image; and controller 25 that causes touch panel 23 to display the image including at least one luminaire 10 captured by camera 22. Controller 25 obtains identification information of at least one luminaire 10 based on the image, and causes, when the control parameter of at least one luminaire 10 captured by camera 22 is settable based on an instruction, touch panel 23 to display information relating to the identification information, in association with at least one luminaire 10. Controller 25 further causes, when luminaire 10 is selected from among at least one luminaire 10 in the image, touch panel 23 to display the control parameter of luminaire 10 selected and to allow setting of the control parameter of luminaire 10 selected.

As described above, even if, for example, operation terminal 20 does not store in advance layout information of luminaires 10, by displaying, by touch panel 23, the image including captured luminaires 10 and setting, by touch panel 23, the control parameter of at least one luminaire 10, it is possible to easily set the control parameter of at least one luminaire 10. In addition, by determining whether the control parameters of luminaires 10 captured by camera 22 are settable by operation terminal 20, it is possible to easily determine which of luminaires 10 is luminaire 10 of which the control parameter is adjustable, and to improve the workability of setting the control parameters.

The image captured by camera 22 may be a moving image.

When controller 25 obtains the identification information of at least one luminaire 10 based on the image, controller 25 may obtain the identification information of at least one luminaire 10 based on information obtained through optical communication with at least one luminaire 10.

The control parameter may be a parameter for determining either one of dimming, toning, and grouping of at least one luminaire 10.

Embodiment 2

Figure 10:
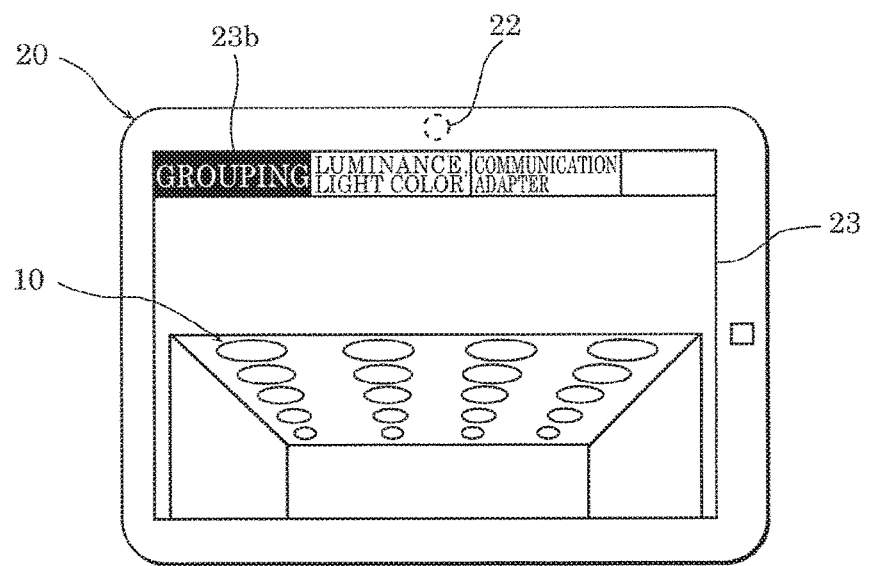
FIG. 10 is a diagram illustrating an exemplary image displayed on the operation terminal in Embodiment 2.
Figure 11:
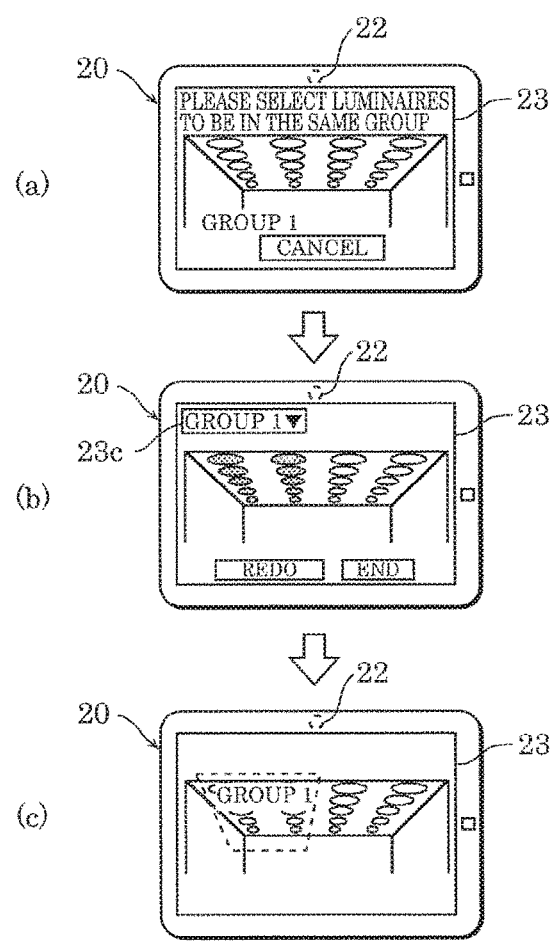
FIG. 11 is a diagram illustrating images sequentially displayed on the operation terminal after the image illustrated in FIG. 10.

In Embodiment 2, luminaires 10 are grouped. FIG. 10 is a diagram illustrating an exemplary image displayed on operation terminal 20 in Embodiment 2. FIG. 11 is a diagram illustrating images sequentially displayed on operation terminal 20 after the image illustrated in FIG. 10.

First, steps S11 to S15 are performed in the same manner as in Embodiment 1. Subsequently, in step S15, touch panel 23 displays selection candidates for control parameter in parameter selection portion 23b. For example, as illustrated in FIG. 10, selection candidates for control parameter such as "GROUPING," "LUMINANCE, LIGHT COLOR," and "COMMUNICATION ADAPTER" are displayed. In Embodiment 2, "GROUPING" is selected as a control parameter to be adjusted.

Next, luminaire 10 is selected from among luminaires 10 in the image displayed on touch panel 23 (S16). Specifically, as illustrated in (a) in FIG. 11, the user selects luminaire 10 to be grouped from among luminaires 10 in the image displayed on touch panel 23. The user may select one luminaire 10 or at least two luminaires 10. In (b) in FIG. 11, luminaires 10 in the left half of the image are selected.

When luminaires 10 to be grouped are selected, touch panel 23 displays the control parameters of selected luminaires 10 (S17). For example, as illustrated in (b) in FIG. 11, a group name of luminaires 10 is displayed as a pull-down menu in parameter displaying and setting portion 23c.

Next, touch panel 23 sets the control parameters of selected luminaires 10 (S18). For example, as illustrated in (c) in FIG. 11, when "GROUP 1" is selected from the pull-down menu, selected luminaires 10 are adjusted to be in "GROUP 1." By adjusting the control parameters regarding a group in parameter displaying and setting portion 23c in the above manner, it is possible to set the group of luminaires 10. At this time, the user can make the setting while checking, on touch panel 23, where grouped luminaires 10 are among all of luminaires 10.

In the control parameter setting method for use in illumination system 100 according to Embodiment 2, it is not necessary to compare the identification information of each luminaire 10, such as a lighting layout displayed on operation terminal 20, and luminaires 10 installed in an actual space, and it is possible to simply and quickly select luminaire 10 to be controlled, by directly selecting luminaire 10 from among luminaires 10 in the image captured by camera 22.

Moreover, in the control parameter setting method for use in illumination system 100 according to Embodiment 2, when one or more luminaires 10 are grouped from among luminaires 10 in the image displayed on touch panel 23, one or more luminaires 10 are selected into a group.

This allows the user to perform the setting while visually checking how one or more luminaires 10 are grouped. Accordingly, it is possible to reduce the occurrence of errors in setting a control parameter and shorten the time taken to perform the setting.

Embodiment 3

Figure 12:
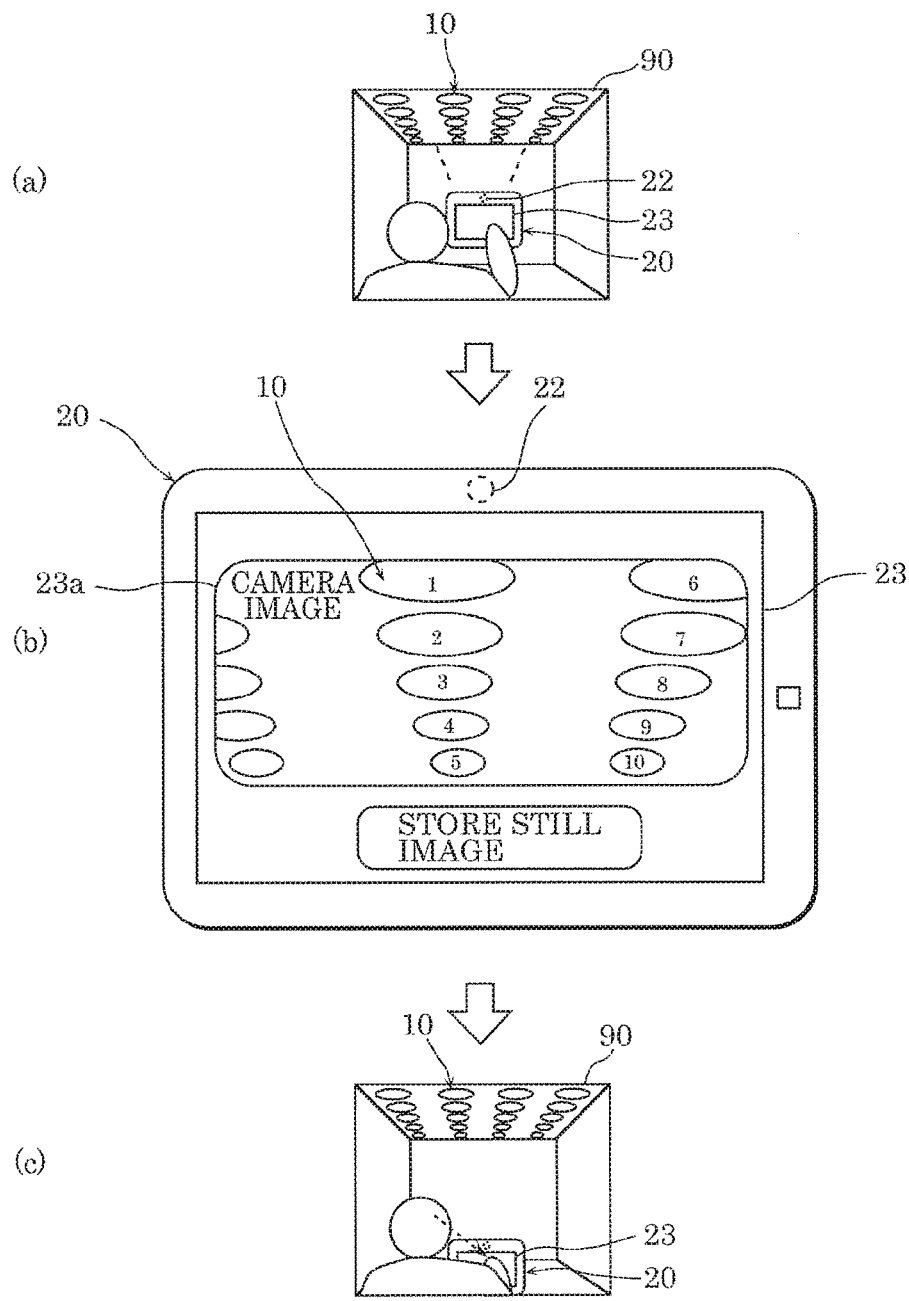
FIG. 12 is a diagram illustrating images sequentially displayed on the operation terminal in Embodiment 3.

In Embodiment 3, a control parameter of luminaire 10 is set based on a still image. FIG. 12 is a diagram illustrating images sequentially displayed on operation terminal 20 in Embodiment 3.

First, as illustrated in (a) in FIG. 12, camera 22 of operation terminal 20 captures luminaires 10 in an image (S11), and touch panel 23 displays the image including luminaires 10 captured by camera 22 (S12). In addition, steps S13 to S15 are performed in the same manner as in Embodiment 1.

Subsequently, in Embodiment 3, as illustrated in (b) in FIG. 12, the image captured by camera 22 is stored as a still image. Specifically, the captured image including luminaires 10 and the information relating to the identification information of each luminaire 10 (e.g., the numbers "1 to 10") are stored as a still image and displayed on touch panel 23. After the still image is stored, luminaires 10 stop transmitting the optical IDs.

Next, as illustrated in (c) in FIG. 12, steps S16 to S18 are performed in the same manner as in Embodiment 1 while the still image displayed on touch panel 23 is being seen. It should be noted that the stored still image (the image including luminaires 10 and the information relating to the identification information) and the control parameter of selected luminaire 10 are displayed in step S17.

After step S18, when the "END" key displayed on touch panel 23 is pressed, the adjusted control parameter is set to operation terminal 20. The set control parameter is transmitted from operation terminal 20 to illumination controller 30, and is stored in storage 36 of illumination controller 30. Lighting of luminaire 10 is controlled based on the set control parameter.

In the control parameter setting method for use in illumination system 100 according to Embodiment 3, it is not necessary to compare the identification information of each luminaire 10, such as a lighting layout displayed on operation terminal 20, and luminaires 10 installed in an actual space, and it is possible to simply and quickly select luminaire 10 to be controlled, by directly selecting luminaire 10 from among luminaires 10 in the image captured by camera 22.

Moreover, in Embodiment 3, the image captured by camera 22 is stored as the still image, and touch panel 23 displays the stored still image and the control parameter of selected luminaire 10.

This enables the setting of the control parameter of luminaire 10 without causing camera 22 to keep capturing luminaires 10 in an image. Accordingly, it is possible to improve the workability of setting a control parameter of luminaire 10.

Embodiment 4

Figure 13:
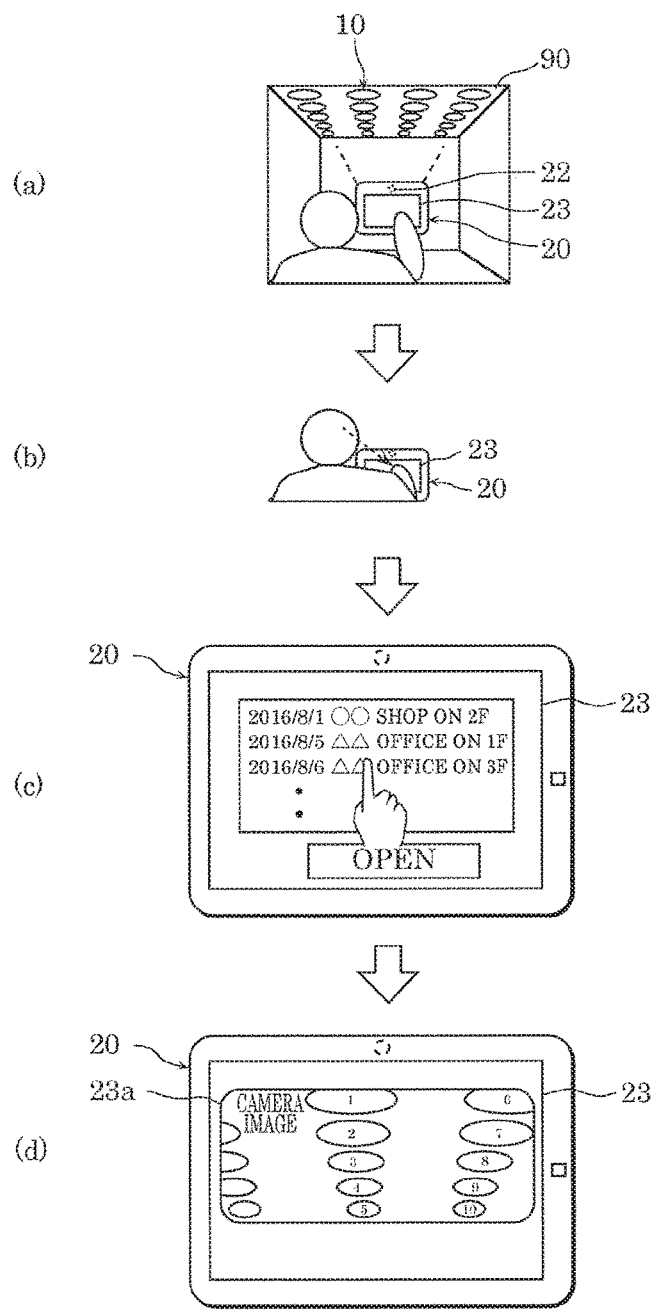
FIG. 13 is a diagram illustrating images sequentially displayed on the operation terminal in Embodiment 4.

In Embodiment 4, control parameters of luminaires 10 are set in a place different from a place where luminaires 10 are captured in an image. FIG. 13 is a diagram illustrating images sequentially displayed on operation terminal 20 in Embodiment 4.

First, as illustrated in (a) in FIG. 13, camera 22 of operation terminal 20 captures luminaires 10 in an image (S11), and touch panel 23 displays the image including luminaires 10 captured by camera 22 (S12). In addition, steps S13 to S15 are performed in the same manner as in Embodiment 1.

Subsequently, in Embodiment 4, the image captured by camera 22 and the identification information of each luminaire 10 are stored as history information. Specifically, luminaires 10 displayed on touch panel 23 and the information relating to the identification information of each luminaire 10 (e.g., the numbers "1 to 10") are stored as history information.

Next, as illustrated in (b) in FIG. 13, the stored history information is called up in a place different from a place where luminaires 10 are captured in the image. First, as illustrated in (c) in FIG. 13, upon calling up the history information, a history list is displayed on touch panel 23. The user touches and selects a history for use in adjustment from the history list. Subsequently, as illustrated in (d) in FIG. 13, the selected history information for use in adjustment is displayed on touch panel 23. After that, steps S16 to S18 are performed in the same manner as in Embodiment 1. It should be noted that an image based on the history information, information relating to the identification information based on the history information, and control parameters of selected luminaires 10 are displayed in step S17.

After step S18, when the "END" key displayed on touch panel 23 is pressed, the adjusted control parameters are set to and stored in operation terminal 20. After operation terminal 20 is moved to the place where the image is captured, the set control parameters are transmitted from operation terminal 20 to illumination controller 30, and are stored in storage 36 of illumination controller 30. Lighting of luminaires 10 is controlled based on the set control parameters. It should be noted that luminaires 10 stop transmitting the optical IDs after the history information is stored.

In the control parameter setting method for use in illumination system 100 according to Embodiment 4, it is not necessary to compare the identification information of each luminaire 10, such as a lighting layout displayed on operation terminal 20, and luminaires 10 installed in an actual space, and it is possible to simply and quickly select luminaires 10 to be controlled, by directly selecting luminaires 10 from among luminaires 10 in the image captured by camera 22.

In Embodiment 4, the image captured by camera 22 and the identification information of each luminaire 10 are stored as the history information, and the image based on the history information, the information relating to the identification information based on the history information, and the control parameters of selected luminaires 10 are displayed on touch panel 23.

As described above, since the history information is stored, it is possible to call up the stored history information in another place at another time to set control parameters of luminaires 10. Accordingly, since the control parameters of luminaires 10 can be set without having to be in the place where the image is captured, it is possible to improve convenience.

Embodiment 5

Figure 14:
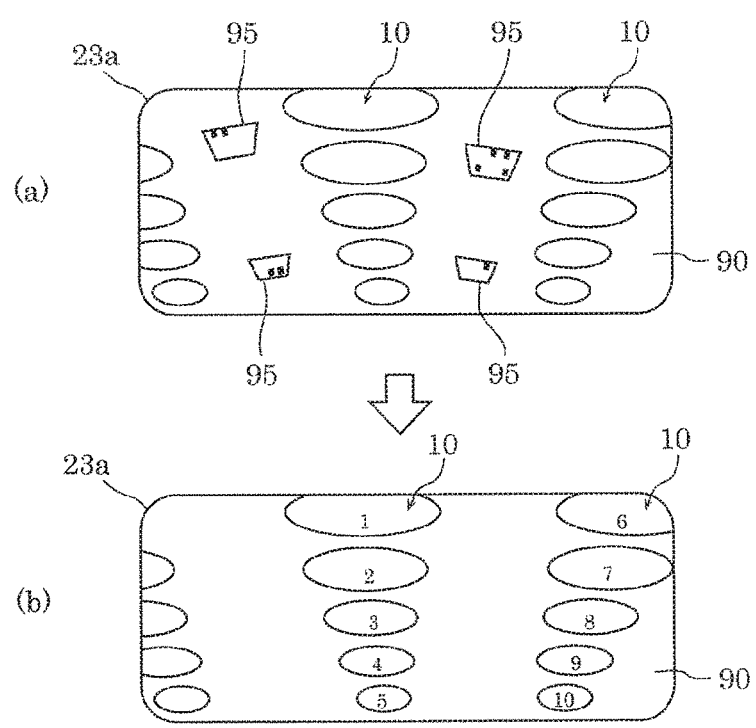
FIG. 14 is a diagram illustrating images sequentially displayed on a touch panel in Embodiment 5.

In Embodiment 5, identification information etc. of each luminaire 10 is obtained using identification markers 95. FIG. 14 is a diagram illustrating images sequentially displayed on touch panel 23 in Embodiment 5.

First, camera 22 of operation terminal 20 captures luminaires 10 in an image (S11), and touch panel 23 displays the image including luminaires 10 captured by camera 22 (S12). Specifically, camera 22 of operation terminal 20 captures, in an image, luminaires 10 in a direction toward ceiling 90. As illustrated in (a) in FIG. 14, the captured image is almost directly displayed on touch panel 23.

In Embodiment 5, a captured image is a still image, and camera 22 captures, in an image, identification markers 95 in a capturing region of camera 22. Identification markers 95 are disposed among luminaires 10 on ceiling 90. Identification markers 95 each are, for example, an infrared marker, and include predetermined comparison information and the identification information of each luminaire 10. It should be noted that camera 22 includes an imaging element capable of capturing infrared rays.

Next, the identification information of each luminaire 10 is obtained based on the captured image (S13). Specifically, controller 25 obtains the identification information etc. of each luminaire 10 based on the information included in identification markers 95 in the captured image. Operation terminal 20 stores relative positional relationships between identification markers 95 and luminaires 10 (a plan view into which position coordinates of identification markers 95 and luminaires 10 are inputted) in advance. Identification markers 95 are detected as coordinate reference points of an area captured by camera 22. This allows operation terminal 20 to calculate the identification information of each luminaire 10 from the positional relationships between identification markers 95 and luminaires 10 captured by camera 22.

Next, operation terminal 20 determines whether the control parameters of captured luminaires 10 are settable by operation terminal 20 (S14).

Specifically, when identification markers 95 captured by camera 22 include the identification information of each luminaire 10, operation terminal 20 determines that the control parameters are settable by operation terminal 20 (Yes in S14). When identification markers 95 do not include the identification information of each luminaire 10, operation terminal 20 determines that the control parameters are not settable (No in S14), and the process returns to step S11.

When the control parameters of luminaires 10 are settable by operation terminal 20, touch panel 23 displays information relating to the identification information, in association with luminaires 10 (S15). Specifically, as illustrated in (b) in FIG. 14, the numbers "1 to 10" are displayed in association with luminaires 10 on a one-to-one basis. After that, steps S16 to S18 are performed in the same manner as in Embodiment 1.

In the control parameter setting method for use in illumination system 100 according to Embodiment 5, it is not necessary to compare the identification information of each luminaire 10, such as a lighting layout displayed on operation terminal 20, and luminaires 10 installed in an actual space, and it is possible to simply and quickly select luminaire 10 to be controlled, by directly selecting luminaire 10 from among luminaires 10 in the image captured by camera 22.

Moreover, in Embodiment 5, when one or more luminaires 10 are captured in an image by camera 22, identification markers 95 in a capturing region of camera 22 are captured in an image by camera 22, and the identification information of each of one or more luminaires 10 is obtained based on the information included in identification markers 95 in the captured image (S13).

By using identification markers 95 in the above described manner, it is possible to quickly and accurately obtain the identification information of each luminaire 10. Moreover, by using identification markers 95, it is possible to obtain the identification information of each luminaire 10 even if the captured image is a still image.

Furthermore, in determining whether the control parameters are settable by operation terminal 20 (S14), when identification markers 95 include the identification information of each luminaire 10, the control parameters may be determined to be settable by operation terminal 20.

As described above, it is possible to easily determine which of luminaires 10 is luminaire 10 of which the control parameter can be adjusted, by checking whether identification markers 95 are included.

The image contains an optical ID transmitted from the at least one luminaire, and when the controller obtains the identification information of the at least one luminaire based on the image, the controller obtains the identification information of the at least one luminaire based on the optical ID.

Other Embodiments

Although the control parameter setting method for use in illumination system 100 etc. is described based on the embodiments, the present invention is not limited to the aforementioned embodiments. For example, forms obtained by various modifications to the aforementioned embodiments that can be conceived by a person skilled in the art as well as forms realized by optionally combining structural components and functions in the aforementioned embodiments which are within the scope of the essence of the present invention are included in the present invention.

While the foregoing has described one or more embodiments and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

For example, although communication adapter 40 is connected to illumination controller 30 in Embodiment 1, at least two communication adapters 40 may be connected to illumination controller 30. When at least two communication adapters 40 are used, "COMMUNICATION ADAPTER" may be selected as a control parameter, and communication adapter 40 connected to luminaires 10 may be switched by setting the control parameter.

What is claimed is:

1. A control parameter setting method for use in an illumination system including: luminaires; an illumination controller that controls lighting of the luminaires; and an operation terminal that communicates with the illumination controller, the control parameter setting method comprising:
   capturing, by a camera of the operation terminal, at least one luminaire among the luminaires in an image, and displaying, by a touch panel of the operation terminal, the image including the at least one luminaire captured by the camera;
   obtaining identification information of the at least one luminaire based on the image;
   determining whether a control parameter of the at least one luminaire captured by the camera is settable by the operation terminal;
   displaying, by the touch panel, information relating to the identification information, in association with the at least one luminaire, when the control parameter is determined to be settable by the operation terminal;
   when a user selects a luminaire from among the at least one luminaire in the image displayed on the touch panel, displaying, by the touch panel, a control parameter of the luminaire selected; and
   setting, by the touch panel, the control parameter of the luminaire selected, wherein:
   when the at least one luminaire is captured by the camera, an optical ID is received from the at least one luminaire,
   in the obtaining of the identification information of the at least one luminaire based on the image, the identification information is obtained based on information included in the optical ID received,
   the control parameter setting method further comprises:
      obtaining identification information of the illumination controller based on the information included in the optical ID received, the obtaining of the identification information of the illumination controller based on the information included in the optical ID received being between the capturing and displaying and the determining, and in the determining, when the identification information of the illumination controller obtained matches identification information of the illumination controller that communicates with the operation terminal, the control parameter is determined to be settable by the operation terminal.

2. The control parameter setting method according to claim 1,
wherein the image is a moving image.

3. The control parameter setting method according to claim 1, further comprising:
storing, as a still image, the image including the at least one luminaire captured by the camera,
wherein in the displaying of the control parameter of the luminaire selected, the still image stored in the storing and the control parameter of the luminaire selected are displayed.

4. The control parameter setting method according to claim 1, further comprising:
storing, as history information, the image including the at least one luminaire captured by the camera and the identification information obtained in the obtaining of the identification information of the at least one luminaire based on the image,
wherein in the displaying of the control parameter of the luminaire selected, the image based on the history information, the information relating to the identification information based on the history information, and the control parameter of the luminaire selected are displayed.

5. The control parameter setting method according to claim 1,
wherein in the displaying of the control parameter of the luminaire selected, the luminaire selected and the control parameter thereof are simultaneously displayed.

6. The control parameter setting method according to claim 1,
wherein when one or more luminaires are grouped from among the at least one luminaire in the image displayed on the touch panel, the one or more luminaires are selected into a group.

7. The control parameter setting method according to claim 1,
wherein the control parameter is a parameter for determining either one of dimming, toning, and grouping of the at least one luminaire.

8. An operation terminal comprising:
a touch panel that displays and sets a control parameter of each of luminaires;
a camera that captures at least one luminaire among the luminaires in an image; and
a controller that causes the touch panel to display the image including the at least one luminaire captured by the camera,
wherein when the camera captures the at least one luminaire, the camera receives an optical ID from the at least one luminaire, and
the controller:
obtains identification information of the at least one luminaire and identification information of an illumination controller based on information included in the optical ID received by the camera;
determines that the control parameter is settable by the operation terminal when the identification information of the at least one luminaire is identical to identification information of the illumination controller that communicates with the operation terminal;
causes the touch panel to display information relating to the identification information, in association with the at least one luminaire; and
further causes, when a luminaire is selected from among the at least one luminaire in the image, the touch panel to display the control parameter of the luminaire selected and to allow setting of the control parameter of the luminaire selected.

9. The operation terminal according to claim 8,
wherein the image is a moving image.

10. The operation terminal according to claim 8,
wherein when the controller obtains the identification information of the at least one luminaire based on the image, the controller obtains the identification information of the at least one luminaire based on information obtained through optical communication with the at least one luminaire.

11. The operation terminal according to claim 8,
wherein the control parameters each are a parameter for determining either one of dimming, toning, and grouping of the at least one luminaire.

12. The operation terminal according to claim 8,
wherein the image contains an optical ID transmitted from the at least one luminaire, and
when the controller obtains the identification information of the at least one luminaire based on the image, the controller obtains the identification information of the at least one luminaire based on the optical ID.

13. A control parameter setting method for use in an illumination system including: luminaires; an illumination controller that controls lighting of the luminaires; and an operation terminal that communicates with the illumination controller, the control parameter setting method comprising:
capturing, by a camera of the operation terminal, at least one luminaire among the luminaires in an image, and displaying, by a touch panel of the operation terminal, the image including the at least one luminaire captured by the camera;
obtaining identification information of the at least one luminaire based on the image;
determining whether a control parameter of the at least one luminaire captured by the camera is settable by the operation terminal;
displaying, by the touch panel, information relating to the identification information, in association with the at least one luminaire, when the control parameter is determined to be settable by the operation terminal;
when a user selects a luminaire from among the at least one luminaire in the image displayed on the touch panel, displaying, by the touch panel, a control parameter of the luminaire selected; and
setting, by the touch panel, the control parameter of the luminaire selected, wherein:
when the at least one luminaire is captured by the camera, optical communication is performed between the at least one luminaire and the operation terminal,
in the obtaining of the identification information of the at least one luminaire based on the image, the identification information is obtained based on information obtained through the optical communication,
the control parameter setting method further comprises:
obtaining identification information of the illumination controller based on information obtained through optical communication, the obtaining of the identification information of the illumination controller based on the information obtained through the optical communication being between the capturing and displaying and the determining, and wherein in the determining, when the identification information of the illumination controller obtained matches identification information of the illumination controller that communicates with the operation terminal, the control parameter is determined to be settable by the operation terminal.

* * * * *